United States Patent Office 2,984,659  
Patented May 16, 1961

---

2,984,659  
NEW AZO-DYESTUFFS

Hugo Miguel Illy, Basel, Switzerland, assignor to Ciba Limited, Basel, Switzerland No Drawing. Filed Oct. 27, 1958, Ser. No. 769,568

Claims priority, application Switzerland Nov. 1, 1957

8 Claims. (Cl. 260—163)

This invention provides azo-dyestuffs which contain at least one group imparting solubility in water, and at least one group of the formula (1)

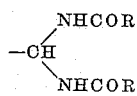

in which R represents a vinyl or β-halogenethyl group. As groups imparting solubility in water there may be mentioned, for example, sulfonic acid amide groups, methyl-sulfone groups, and especially acid groups imparting solubility in water such as carboxylic acid or sulfonic acid groups.

The group of the Formula 1 may be bound to the dyestuff molecule through an alkylene or arylene radical, but is preferably bound directly to an aromatic nucleus of the dyestuff molecule. The dyestuff may contain further substituents, especially substituents not imparting solubility in water, for example, halogen atoms or nitro, acylamino, alkyl or alkoxy groups.

The invention also provides a process for the manufacture of azo-dyestuffs by coupling a diazotized amine with a coupling component, wherein the diazotized amine and coupling component are so chosen that the dyestuff obtained contains at least one acid group imparting solubility in water and at least one group of the Formula 1. Thus, for example, (a) a diazo component containing a group of the Formula 1 may be coupled with any desired coupling component containing at least one group imparting solubility in water, or (b) any desired diazo-component containing at least one acid group imparting solubility in water is coupled with a coupling component containing a group of the Formula 1. For procedure (a) there are advantageously used as diazo-components amines of the formula (2)  
$$\begin{array}{c} \text{RCONH} \\ \phantom{RC}\diagdown \\ \phantom{RCO}\text{CH—A—NH}_2 \\ \phantom{RC}\diagup \\ \text{RCONH} \end{array}$$

in which A represents a benzene or naphthalene radical which may contain further substituents, for example, an alkyl or alkoxy group or halogen atom, especially a chlorine atom.

As examples there may be mentioned compounds of the following formulae (3)

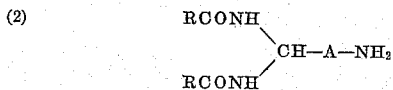

(4)

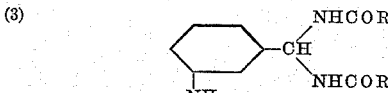

(5)

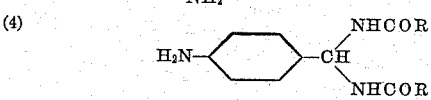

(6)

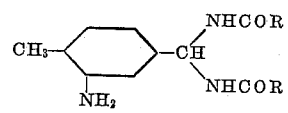

(7)

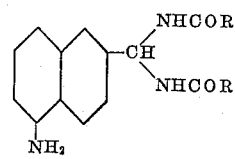

(8)

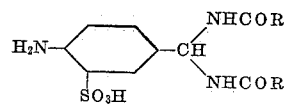

In the above formulae R represents a vinyl or β-chlorethyl group.

The amines of the Formulae 3 to 8 are new compounds and can be obtained by reducing the corresponding nitro-compounds under conditions such that the acid radicals are not split off, advantageously by catalytic hydrogenation. The nitro-compounds can be obtained, for example, by the process of United States Patent No. 2,475,846, patented July 12, 1949, by Lennart A. Lundberg by condensing 1 molecular proportion of a nitroaldehyde with 2 molecular proportions of β-chloropropionic acid amide or of acrylic acid amide in the presence of a strong acid, especially hydrochloric acid or sulfuric acid.

For use in procedure (b) there may be used as diazo-components the following amino-sulfonic acids:

1-aminobenzene-2-, -3- or -4-sulfonic acid,  
2-amino-1-methoxybenzene-4-sulfonic acid,  
3-amino-2-hydroxybenzoic acid-5-sulfonic acid,  
3-amino-6-hydroxybenzoic acid-5-sulfonic acid,  
2-aminophenol-4-sulfonic acid,  
5-acetylamino-2-aminobenzene-1-sulfonic acid,  
4-acetylamino-2-aminobenzene-1-sulfonic acid,  
5-acetylamino- or 5-benzoylamino-2-aminobenzene-1-carboxylic acid,  
2-aminobenzoic acid-4- or -5-sulfonic acid,  
1-aminonaphthalene-4-, -5-, -6- or -7-sulfonic acid,  
2-aminonaphthalene-4-, -6-, -7- or -8-sulfonic acid,  
1-aminonaphthalene-3:6-disulfonic acid,  
1-aminobenzene-2:5-disulfonic acid,  
1-aminonaphthalene-4:8-, -5:7- or -6:8-disulfonic acid,  
1-(3'- or 4'-aminobenzoyl)-aminobenzene-3-sulfonic acid,  
3-aminopyrene-5:8- or -5:10-disulfonic acid,  
4-nitro-4'-aminostilbene-2:2'-disulfonic acid, and also O-acyl derivatives of aminonaphthol sulfonic acids, for example, O-acyl derivatives of 1-amino-8-hydroxynaphthalene-3:6- or 4:6-disulfonic acid, dehydrothiotoluidine mono- or di-sulfonic acid.

Equally suitable diazo components are aminomonoazo dyestuffs containing sulfonic acid groups, which can be prepared, for example, by coupling a diazotized monoacyl derivative of an aromatic diamine with a coupling component containing an aromatic hydroxyl group or a ketomethylene group and subsequent hydrolysis of the resulting acylaminomonoazo dyestuffs, for example the aminomonoazo dyestuffs obtainable by hydrolysis from phenols, naphthols, 5-pyrazolones, barbituric acids, hydroxyquinolines, β-ketocarboxylic acid derivatives and diazotized monoacyldiaminobenzene, monoacyldiaminostilbene disulfonic acids or the like. As diazotizable aminoazo dyestuffs may be used also coupling products of one of the specified coupling components containing amino groups with the diazo compounds of the likewise specified amino-sulfonic acids.

It is of advantage to couple such starting materials as yield aminoazo dyestuffs containing at least two groups imparting solubility in water.

As suitable coupling components may be mentioned: Amines of the benzene or naphthalene series, preferably those which contain at least one group imparting solubility in water for example N-sulfato-ethyl aniline, 1-aminonaphthalene-2-, -4-, -5-, -6- or -8-sulfonic acid, 1-aminonaphthalene-3:6-disulfonic acid, 1-aminonaphthalene-3:8-disulfonic acid, 2-aminonaphthalene-6:8-disulfonic acid, furthermore compounds containing aromatically bound hydroxyl groups, for example phenols such as 1-hydroxy-2-carboxybenzene, and more especially the sulfonic acids of α-naphthol or β-naphthol, for example 1-hydroxy-naphthalene-3-, -4-, -5-, or -8-sulfonic acid, 2-hydroxy-naphthalene-4-, -5-, -6-, -7- or -8-sulfonic acid, 1:8-di-hydroxynaphthalene-3:6-disulfonic acid, 2-hydroxynaphthalene-3:6- or -6:8-disulfonic acid, 1-hydroxynaphthalene-3:6- or -3:8-disulfonic acid, 1-amino - 8 - hydroxy-naphthalene-2:4-, -3:6- or -4:6-disulfonic acid, 2-amino-8-hydroxynaphthalene-3-sulfonic acid, 2-amino-5-hydroxy-naphthalene-17-sulfonic acid and the N-acyl derivative of aminonaphthol sulfonic acids in which the acyl radical is an acetyl, propionyl, butyryl, chloracetyl, benzoyl, ortho-, meta- or para-chlorobenzoyl, nitrobenzoyl, tertiary butyl benzoyl, 3'- or 4'-aminobenzoyl, methanesulfonyl, ethanesulfonyl, para-toluenesulfonyl or chlorobenzenesulfonyl radical or a carbomethoxy or carbethoxy radical such, for example, as 1-hydroxy-8-benzoylamino-naphthalene-3:6-disulfonic acid or 1-hydroxy-4'-amino-6-benzoylaminonaphthalene-3-sulfonic acid. Equally suitable as coupling components are compounds containing an enolizable keto group, for example β-ketocarboxylic acid esters or amides capable of coupling in the α-position, for example acetoacetic acid arylides, pyrazoles, more especially 5-pyrazolones capable of coupling in the 4-position, such as 5-pyrazolone-3-carboxylic acid,
1-phenyl-5-pyrazolone-3-carboxylic acid,
1-phenyl-3'-amino-5-pyrazolone-3-carboxylic acid,
1-phenyl-3-methyl-5-pyrazolone-2'-, 3'- or -4'-sulfonic acid,
1-phenyl-3-methyl-5-pyrazolone-2':5'-dichloro-4'- sulfonic acid,
1-phenyl - 3 - methyl-5-pyrazolone-2':5'-disulfonic acid,
1-phenyl-3-methyl-5-pyrazolone-3'-sulfonamide,
Barbituric acids or hydroxyquinolines such as 8-hydroxyquinoline or 2:4-dihydroxyquinoline.

When the diazo component contains no group of Formula 1, such a group must be present in the coupling component. For this purpose are particularly suitable amino or hydroxy compounds of the benzene or naphthalene series, for example the amines of the above formulae 3, 6 and 7.

The coupling is advantageously performed in a weakly acid, neutral or alkaline medium, for example a medium rendered alkaline with an alkali metal bicarbonate or carbonate, preferably in the cold.

The dyestuffs obtained by the present process are suitable for dyeing and printing a wide variety of materials, more especially polyhydroxylated fibrous materials such as cellulose and synthetic fibers, for example of polyvinyl alcohol or regenerated cellulose, or natural materials, for example linen or above all cotton. They are suitable for dyeing by the so-called direct-dyeing method as well as for printing or pad-dyeing, in which method the dyestuff is applied to the material to be dyed and fixed thereon by a heat treatment, for example, steaming, in the presence of an alkali. It is of advantage to perform the fixation of the dyestuff on the material to be dyed with the aid of a rather strong alkali, for example an alkali metal hydroxide, to achieve better fixation. Good results are achieved even at pH values above 9 or preferably above 10.

The dyeings produced with the dyestuffs of the invention on cellulose fibers are as a rule distinguished by the purity of their tints, by good fastness to light and above all by outstanding fastness to washing.

The dyestuffs of the invention which contain at most two sulfonic acid groups, or preferably a single acid group imparting solubility in water, are likewise suitable for dyeing and printing nitrogenous textile materials such as leather, silk and above all wool, as well as superpolyamide or superpolyurethane fibers from a weakly alkaline bath.

The dyeings obtained with such dyestuffs on wool have excellent fastness to washing and fulling.

The following examples illustrate the invention. Unless otherwise indicated, parts and percentages are by weight.

Example 1

6.3 parts (0.02 mol) of 3-aminobenzylidene-bis-(β-chloropropionyl)-amide are dissolved in 600 parts of water and 6.2 parts of hydrochloric acid of 30% strength and diazotized with 5 parts of 4 N-sodium nitrite solution at 0 to 5° C. The clear diazo solution is added dropwise to a solution of 4.78 parts of 2-amino-5-naphthol-7-sulfonic acid, 200 parts of water and 7 parts of sodium carbonate, and the mixture is further stirred at the same temperature. On completion of the coupling, the dyestuff is salted out with 30 parts of sodium chloride. It forms a reddish brown powder corresponding to the formula

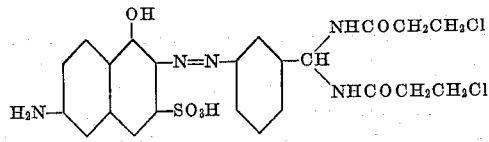

and dyes cotton orange tints.

The 3-aminobenzylidene-bis-(β-chloropropionyl)-amide used in the first paragraph above can be prepared in the following manner:

10.7 parts of β-chloropropionyl amide (0.1 mol)
6.04 parts of meta-nitrobenzaldehyde (0.04 mol)
6 parts by volume of alcohol, and
3 parts by volume of hydrochloric acid of 37% strength are stirred for 45 minutes at 50 to 60° C. The reaction product settles out from the clear solution; after cooling, it is filtered off and stirred into water. The crude white reaction product is recrystallized from alcohol. It melts at 193–194° C.

The catalytic hydrogenation is conducted as described in Example 2. The resulting 3-aminobenzylidene-bis-(β-chloropropionyl)-amide melts at 136–137° C. after having been recrystallized from alcohol.

Example 2

2.45 parts (0.01 mol) of 3-aminobenzylidene-diacrylamide are dissolved with heating in 500 parts of water and 4 parts of hydrochloric acid of 30% strength. The resulting solution is rapidly cooled to 0° C. and diazotized with 10 parts of N-sodium nitrite solution. The filtered clear solution is run at 0 to 5° C. into a suspension of 2.39 parts of 2-amino-8-naphthol-6-sulfonic acid, 25 parts of water and 3 parts of hydrochloric acid of 30% strength. Towards the end of the coupling the solution is neutralized with sodium acetate and the dyestuff is salted out with 25 parts of sodium chloride; it corresponds to the formula

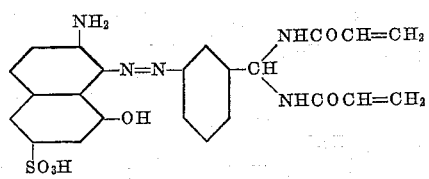

and dyes cotton red tints.

The 3-aminobenzylidene-diacrylamide used as starting material in this example can be prepared as follows:

41.2 parts (0.15 mol) of 3-nitrobenzylidene-bis-acrylamide are dissolved in a mixture of 350 parts of dimethyl formamide and 280 parts of alcohol and hydrogenated with the use of Raney nickel as catalyst. After 10.1 liters of hydrogen have been absorbed, the hydrogenation is discontinued. Evaporation of the solution yields the crystalline product which melts at 186–187° C. after recrystallization from alcohol.

The amines listed in column I of the following table are diazotized as described in this example and then coupled with the coupling components shown in column II to yield dyestuffs which dye cotton the tints listed in column III.

| | I<br>Diazo component | II<br>Coupling component | III<br>Tint on cotton |
|---|---|---|---|
| 1 | 3-aminobenzylidene-bis-(β-chloropropionyl)-amide 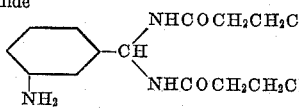 | 1-phenyl-3-methyl-5-pyrazolone-4′-sulfonic acid | Reddish yellow. |
| 2 | 3-aminobenzylidene-bis-(β-chloropropionyl)-amide 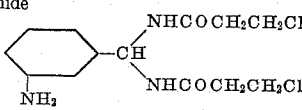 | 1-phenyl-(3′-amino)-5-pyrazolone-3-carboxylic acid | Yellow. |
| 3 | 3-aminobenzylidene-bis-(β-chloropropionyl)-amide 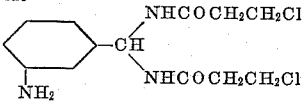 | 2-amino-8-naphthol-6-sulfonic acid | Red. |
| 4 | 3-aminobenzylidene-bis-(β-chloropropionyl)-amide 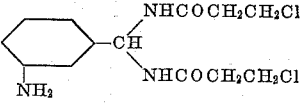 | 2-aminonaphthalene-3:6-disulfonic acid | Orange. |
| 5 | 3-aminobenzylidene-bis-(β-chloropropionyl)-amide 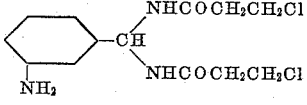 | 1-naphthol-6-(4′-amino)-benzoylamino-3-sulfonic acid 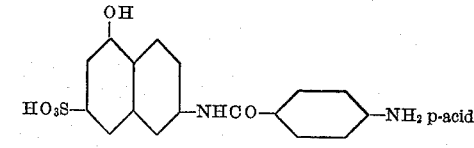 p-acid | Scarlet. |
| 6 | 3-aminobenzylidene-bis-(β-chloropropionyl)-amide 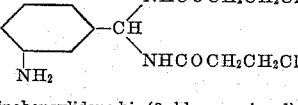 | 1-naphthol-8-benzoyl-amino-3:6-disulfonic acid | Red. |
| 7 | 4-aminobenzylidene-bis-(β-chloropropionyl)-amide 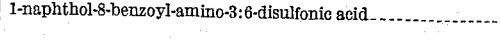 | 1-phenyl-3-methyl-5-pyrazolone-4′-sulfonic acid | Yellow. |
| 8 | 4-aminobenzylidene-bis-(β-chloropropionyl)-amide 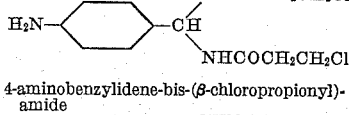 | 2-amino-8-naphthol-6-sulfonic acid | Red. |
| 9 | 4-aminobenzylidene-bis-(β-chloropropionyl)-amide 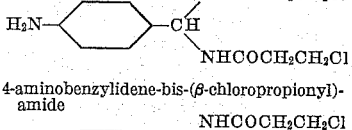 | 1-phenyl-3-methyl-5-pyrazolone-2′:5′-di-sulfonic acid | Reddish yellow. |
| 10 | 4-aminobenzylidene-bis-(β-chloropropionyl)-amide 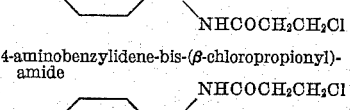 | 1-phenyl-3-methyl-5-pyrazolone-2′:5′-di-chloro-4′-sulfonic acid | Yellow. |
| 11 | 3-aminobenzylidene-bis-(acrylamide) 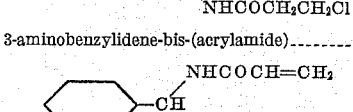 | 1-phenyl-3-methyl-5-pyrazolone-2′:5′-di-chloro-4′-sulfonic acid | Do. |

| | I<br>Diazo component | II<br>Coupling component | III<br>Tint on cotton |
|---|---|---|---|
| 12 | 3-aminobenzylidene-bis-(acrylamide) 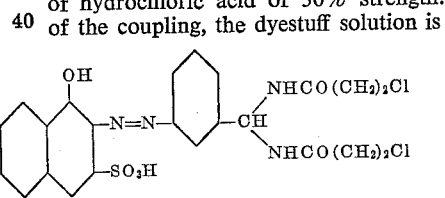 | 1-naphthol-8-benzoyl-amino-3:6-disulfonic acid | Red. |
| 13 | 3-aminobenzylidene-bis-(acrylamide) 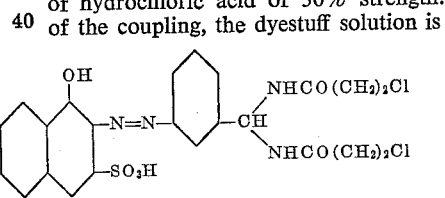 | 1-naphthol-8-acetyl-amino-3:6-disulfonic acid | Do. |
| 14 | 3-aminobenzylidene-bis-(acrylamide) 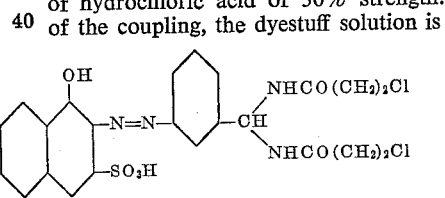 | 1-phenyl-(3'-amino)-5-pyrazolone-3-carboxylic acid | Golden yellow. |
| 15 | 3-aminobenzylidene-bis-(acrylamide) 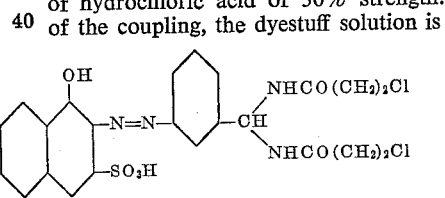 | 1-phenyl-(3'-sulfamido)-3-methyl-5-pyrazolone | Yellow. |

Example 3

6.36 parts (0.02 mol) of 3-aminobenzylidene-di-(β-chloro-propionyl)-amide are diazotized as described in Example 2. The clear solution is cooled to 0° C. and added dropwise at 25° C. to a solution of 5.04 parts (0.01 mol) of the symmetrical urea of 2-amino-5-hydroxynaphthalene-7-sulfonic acid, 200 parts of water and 5 parts of sodium carbonate. On completion of the coupling the dyestuff solution is neutralized with hydrochloric acid and the dyestuff salted out with 15 parts of sodium chloride, it corresponds to the formula

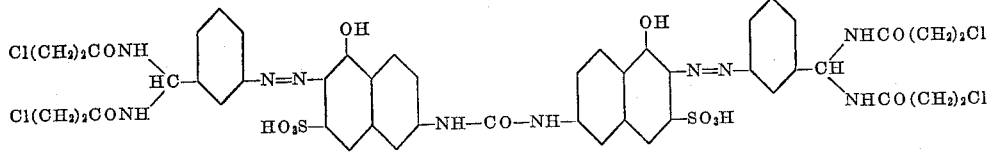

and forms a pale red powder which dyes cotton scarlet tints.

Example 4

2.45 parts of 4-aminobenzylidene-bis-(β-chloropropionyl)-amide are diazotized as described in Example 1, and the reaction mixture is made up to 340 parts by volume with water. 170 parts of this clear diazo solution are added dropwise to a suspension of 3.5 parts of 1-amino-8-naphthol-3:6-disulfonic acid, 200 parts of water and 3 parts of hydrochloric acid of 30% strength at 0° C. while stirring continuously, the hydrochloric acid being cautiously neutralized with sodium acetate (pH=3.5). On completion of the coupling of the monoazo dyestuff, the solution is rendered alkaline to brilliant red paper with 18 parts of sodium carbonate and mixed with 170 parts of the above diazo solution, whereupon the red coloration changes to violet. On completion of the coupling, the mixture is neutralized with hydrochloric acid and the dye-stuff salted out with 40 parts of sodium chloride. The resulting disazo dyestuff corresponds to the formula

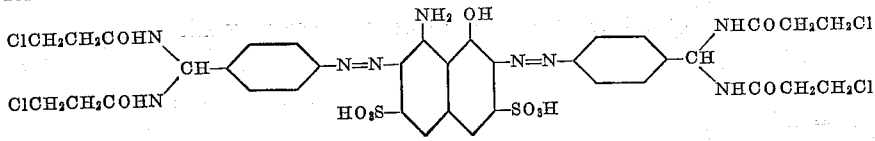

and forms a violet powder which dyes cotton violet tints by the method described in Example 6.

Example 5

5.78 parts of 2-aminonaphthalene-4:8-disulfonic acid are diazotized in the usual manner, and the resulting diazo solution is treated dropwise with stirring at 10° C. with a solution of 4.9 parts of 3-aminobenzylidene-bis-(β-chloropropionyl)-amide in 200 parts of water and 2 parts of hydrochloric acid of 30% strength. On completion of the coupling, the dyestuff solution is heated to 60° C. and the dyestuff is salted out with 40 parts of sodium chloride; it corresponds to the formula

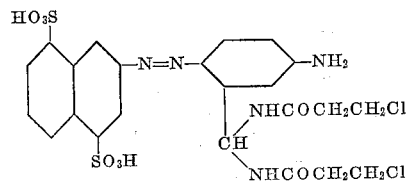

and forms a brown powder which dyes cotton orange tints by the method described in Example 6.

Example 6

1 part of the dyestuff of Example 6 of the table is mixed with 9 parts of urea and dissolved in 100 parts of water.

This solution is used to impregnate a cotton fabric at 80° C. on the padder, and the surplus liquor is then squeezed off until the weight of the fabric shows an increase of 75%.

The material thus impregnated is dried and then impregnated at room temperature with a solution containing per liter 10 grams of sodium hydroxide and 300 grams of sodium chloride, squeezed to a weight increase of 75%, steamed for 60 seconds at 100 to 101° C., rinsed, treated in 0.5% sodium bicarbonate solution, rinsed, soaped for 15 minutes in a boiling 0.3% solution of a non-ionic detergent, rinsed and dried.

A vivid red dyeing fixed fast to boiling results. When a spun rayon fabric instead of a cotton fabric is treated as described, a similarly good result is achieved.

What is claimed is:

1. An azo-dyestuff which contains at least one group imparting solubility in water and which corresponds to the formula

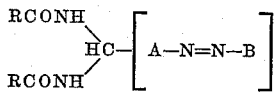

in which A represents a member selected from the group consisting of benzene and naphthalene radicals, B represents the radical of a coupling component selected from the group consisting of naphthols, p-aminobenzenes and 5-pyrazolones, and R is a member selected from the group consisting of vinyl and β-halogenethyl groups, and in which formula the radical of the formula

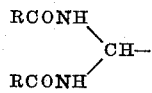

is bound directly to a benzene nucleus which is itself bound directly to the azo linkage.

2. An azo dyestuff which contains at least one group imparting solubility in water and which corresponds to the formula

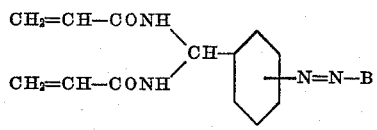

in which B represents the radical of a coupling component selected from the group consisting of naphthols, p-aminobenzenes and 5-pyrazolones.

3. An azo dyestuff which contains at least one group imparting solubility in water and which corresponds to the formula

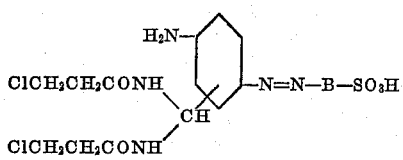

in which B represents a member selected from the group consisting of the sulfobenzene and sulfonaphthalene radicals.

4. The azo-dyestuff of the formula

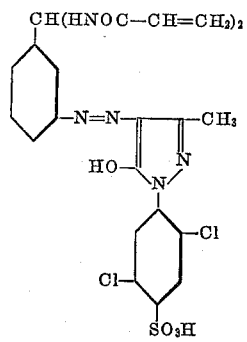

5. The azo dyestuff of the formula

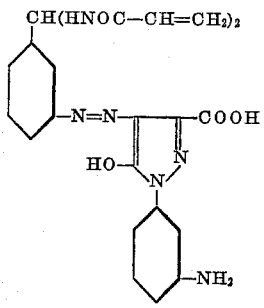

6. The azo dyestuff of the formula

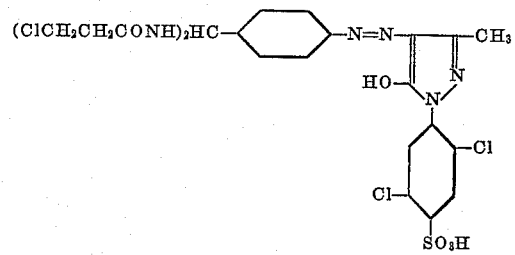

7. The azo dyestuff of the formula

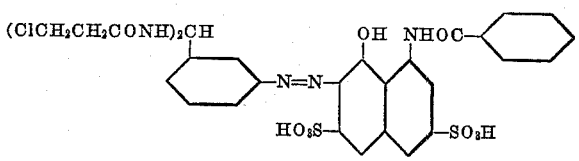

8. The azo dyestuff of the formula

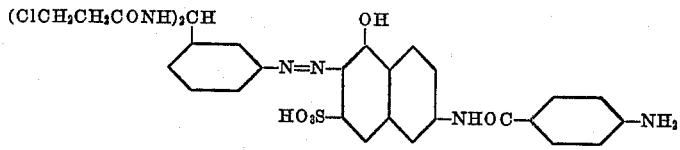

References Cited in the file of this patent

UNITED STATES PATENTS

| | | |
|---|---|---|
| 2,126,468 | Holzach et al. | Aug. 9, 1938 |
| 2,158,283 | Haddock et al. | May 16, 1939 |
| 2,200,423 | Krebser | May 14, 1940 |
| 2,274,717 | Lyford | Mar. 3, 1942 |
| 2,398,367 | Felix et al. | Apr. 16, 1946 |
| 2,402,538 | Dreyfus | June 25, 1946 |
| 2,657,205 | Heyna et al. | Oct. 27, 1953 |
| 2,720,517 | Kartaschoff | Oct. 11, 1955 |

UNITED STATES PATENT OFFICE
CERTIFICATE OF CORRECTION

Patent No. 2,984,659　　　　　　　　　　　　　　　　May 16, 1961

Hugo Miguel Illy

It is hereby certified that error appears in the above numbered patent requiring correction and that the said Letters Patent should read as corrected below.

Column 3, line 21, for "naphthalene-17-sulfonic" read -- naphthalene-7-sulfonic --.

Signed and sealed this 10th day of October 1961.

(SEAL)
Attest:

ERNEST W. SWIDER　　　　　　　　　　　　　　　　DAVID L. LADD
Attesting Officer　　　　　　　　　　　　　　　　Commissioner of Patents

USCOMM-DC